United States Patent
Vaidyanathan et al.

(10) Patent No.: US 8,139,699 B2
(45) Date of Patent: *Mar. 20, 2012

(54) PROCESS FOR PREAMBLE DETECTION IN A MULTI-STREAM 802.16E RECEIVER

(75) Inventors: Karthik Vaidyanathan, Bangalore (IN); Suryanarayana Varma Nallaparaju, Vizianagaram (IN)

(73) Assignee: Redpine Signals, Inc., San Jose, CA (US)

( * ) Notice: Subject to any disclaimer, the term of this patent is extended or adjusted under 35 U.S.C. 154(b) by 737 days.

This patent is subject to a terminal disclaimer.

(21) Appl. No.: 12/185,688

(22) Filed: Aug. 4, 2008

(65) Prior Publication Data

US 2010/0027604 A1 Feb. 4, 2010

(51) Int. Cl.
*H04L 7/00* (2006.01)
(52) U.S. Cl. .......................................... 375/368
(58) Field of Classification Search .......... 375/354, 375/365, 368
See application file for complete search history.

(56) References Cited

U.S. PATENT DOCUMENTS 7,711,074 B2* 5/2010 Lee et al. .................. 375/343
2008/0273634 A1* 11/2008 Patel et al. .................. 375/343
* cited by examiner

*Primary Examiner* — Kevin Kim
(74) *Attorney, Agent, or Firm* — File-EE-Patents.com; Jay A. Chesavage

(57) ABSTRACT

A preamble detector for a plurality of streams of baseband digitized signals has a plurality of preamble processors, each preamble processor coupled to an input and generating an output. Each preamble processor has an input coupled to a first delay, the output of the first delay coupled to a second delay generating an output. The first and second delay are substantially equal to a preamble part. A first multiplier generates an output from a conjugated output of the second delay output and a first delay output. A second multiplier generates an output from a conjugated first delay output and an input stream. The first and second multiplier outputs are accumulated over an interval, and the complex output of the accumulator is formed into a magnitude, thereby generating the output of each preamble processor. The outputs of the preamble processors are summed and compared to a threshold to generate a preamble detect.

19 Claims, 5 Drawing Sheets

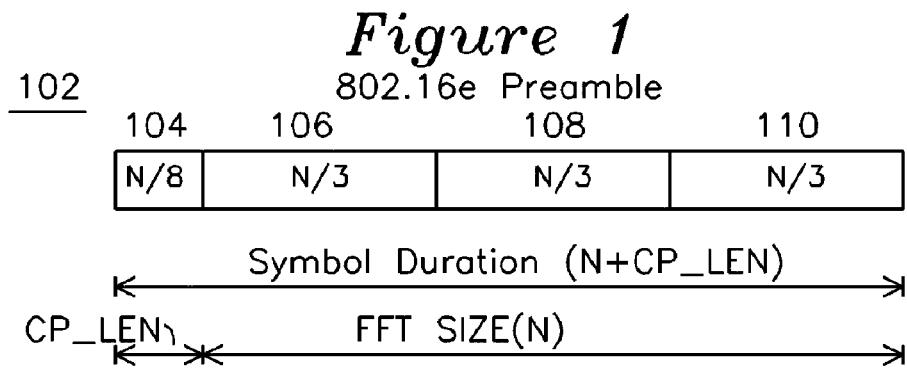
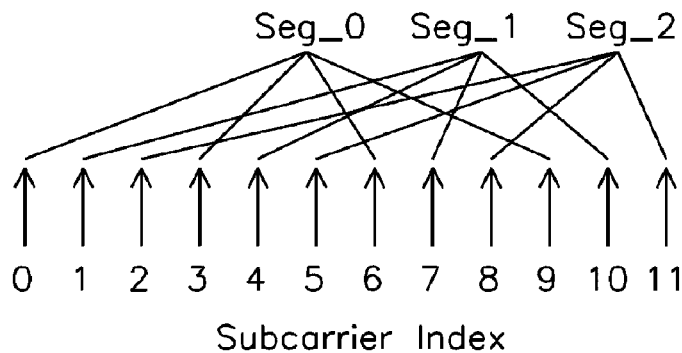
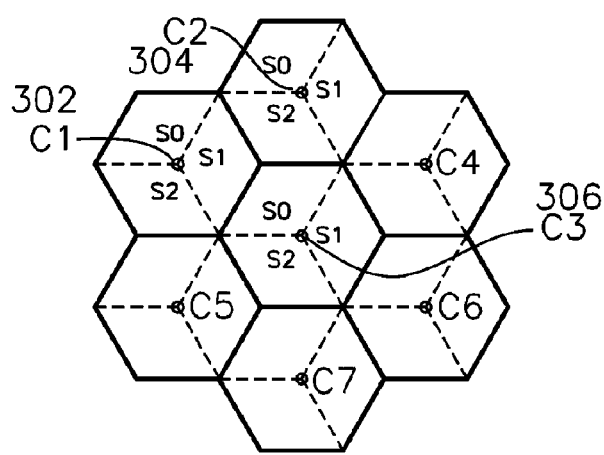

Baseband Receiver

Shifted Correlator

Plot of shifted auto-correlation output

Multiple RX_IQ preamble detection

Antennas combining power w/o interference

Total power from base stations

Total power from base stations

Total power from base stations

Total power from base stations

Total power from base stations

Total power from base stations

Total power from base stations

Total power from base stations

Multiple RX_IQ preamble detection

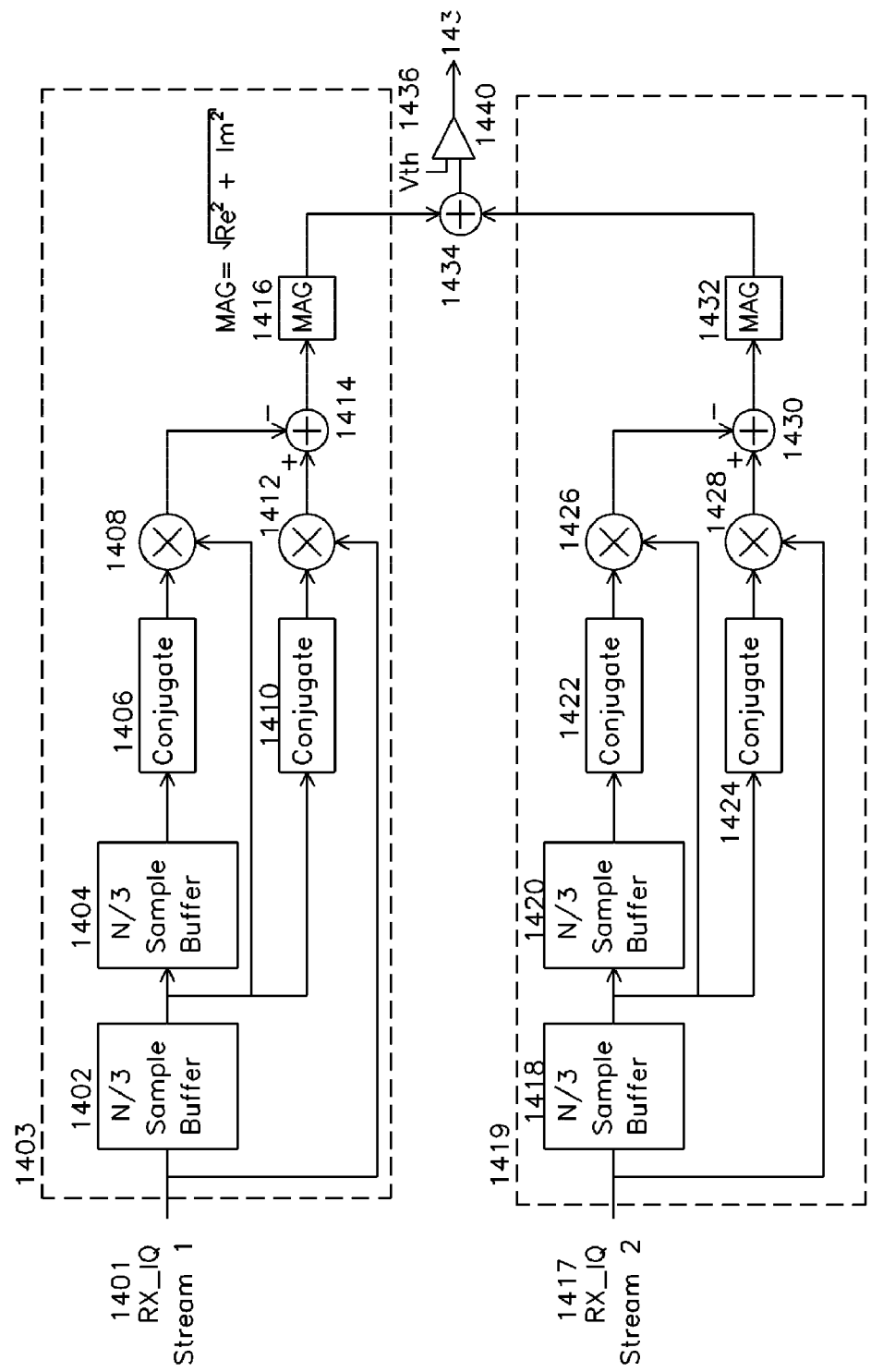

PROCESS FOR PREAMBLE DETECTION IN A MULTI-STREAM 802.16E RECEIVER

FIELD OF THE INVENTION

The present invention relates to the detection of preambles transmitted by orthogonal frequency division multiple access (OFDMA) systems such as those described in the IEEE 802.16e WiMAX standard. In particular, the invention relates to the detection of preambles received by a Subscriber Station (SS) in the presence of interference from neighboring Base Stations (BS).

BACKGROUND OF THE INVENTION

The IEEE 802.16e-2005 standard uses Time Division Multiplexing (TDM) to enable multiple users to be serviced with data transfer, coordinated by a Base Station. Synchronized time slots are allocated for data transmission from the BS to the Mobile Subscriber (MS), a direction of data flow known as a downlink, and for data transmission from the MS to the BS, known as an uplink. Uplink communications and downlink communications may use the same frequency band and are therefore differentiated by time slot. The 802.16e standard uses Orthogonal Frequency Division Multiplexing—Multiple Access (OFDMA) as the modulation method for transmitting data on the RF channel. These bursts of transmissions require the receiver to synchronize to the transmitter before data can be extracted from the signals. The Downlink subframe therefore starts with a Preamble and is followed by the data symbols.

FIG. 1 shows a preamble according to 802.16e standard where 'N' is the FFT size used in the downlink and 'CP_LEN' is the cyclic prefix associated with any OFDM symbol. The possible values of 'N' are 512 and 1024. Since N is not exactly divisible by three, the sample delay used is round(N/3) where round( ) is a round-off function to the nearest integer.

Each BS segment in a cell will transmit every 3rd subcarrier in the preamble according to the segment allocated to the BS as shown in FIG. 2. It can be seen from FIG. 3 in combination with FIG. 2 that different adjacent segments use different sets of subcarriers, and that the configuration of FIG. 2 is a typical cell arrangement. One characteristic of the subcarriers as shown in FIG. 2 is that the Seg_0 subcarriers will accumulate 0 degrees of phase shift over an N/3 interval shown in FIG. 1, the Seg_1 subcarriers will accumulate 240 degrees of phase shift over an N/3 interval, and the Seg_2 subcarriers will accumulate 120 degrees of phase shift over an N/3 interval.

FIG. 4 shows the block diagram of a prior art wireless receiver. Antenna 405 is coupled to RF front end 404 which converts the signal to baseband and has adjustable gain controlled by AGC 402, which is operative over a part of the preamble. ADC 406 samples the baseband converted signal to an IQ baseband data stream referred to as RX_IQ. The main function of the synchronization block 408 is to detect the frame boundary using the pre-defined preamble of the RX_IQ stream. The remote transmitter boosts the preamble in power by 3 dB compared to the data symbols which follow the preamble. The frame preamble is a repetitive sequence specifically designed for robust detection and identification in a receiver. A typical implementation of preamble detection logic would use shifted auto-correlation between the repetitions in the preamble, whereby the preamble is correlated with time-shifted shifted version of itself with a shift of 'N/3' and the shifted correlation is accumulated over a window having an extent of N/3+N/8.

FIG. 5 shows the computation of shifted auto correlation for an 802.16e receiver, where the autocorrelator includes multiplier 510 which is multiplying first values from the first preamble part 504 with conjugated 511 second values from second preamble part 506, and the result of each multiply 510 is accumulated 512 over a window equal to N/8. The preamble can be detected by observing the output of the accumulator 512 in combination with a threshold to make the preamble detection decision. The shifted correlation is a complex value with a defined plateau. The width of the plateau would be CP_LEN (N/8) due to the accumulation of the correlation over a window of 'N/8'.

The shifted correlation is computed as $$\text{shifted\_corr}(k) = \sum_{n=0}^{CP\_LEN-1} x(k-n) \times x^*(k-n-D)$$

Where CP_LEN is equal to 'N/8', and D is the delay representing the separation between repeating preamble symbols used for the shifted version of the preamble.

FIG. 6 shows the property of shifted auto-correlation such as the output 514 of accumulator 512. Magnitude 606 of the accumulator output is compared to a threshold level 604 for detection of preamble, and phase 602 shows a flat characteristic over the preamble correlation extent. As was described earlier, the phase plateau 603 for a Seg_0 segment will be 0 degrees, the phase plateau 603 for a Seg_1 segment will be 240 degrees, whereas the phase plateau 603 for a Seg_2 segment will be 120 degrees. The particular threshold value for preamble detection is based on the magnitude of the raw I and Q samples coming in, such that as the average signal energy increases, the threshold also increases so as to keep noise or other random patterns from triggering a false preamble-detect event.

FIG. 7 shows the block diagram for prior art preamble detection with multiple input receive streams, such as from multiple antennas as used in multiple input multiple output (MIMO) wireless systems. Preambles 716 and 718 represent the RX_IQ streams from a first and second ADC associated with a first and second antenna, and the two streams are separately conjugated (703, 707), multiplied (702, 706), and accumulated (704, 708). The first accumulator 704 and second accumulator 708 outputs are added 710 to form output 714, which is threshold compared, and the resultant value is used to determine the presence of a preamble. Multipliers 702 and 706 operate on complex values, and are used in combination with associated conjugators 703 and 707 to compute the dot-product of the complex preamble samples by multiplying them with delayed and conjugated versions. The conjugation operation 703 and 707 involves reversing the magnitude of the imaginary component. The resultant dot product which is accumulated 704 and 708 is also complex. The accumulation is carried out over a predetermined window (N/3), which windowing can be done many ways, including subtracting the dot-products of the N/3 delayed sample with a further N/3 delayed samples, thereby cancelling out old accumulated values and preserving the desired current window. Each accumulator is reset to zero when preamble detection is accomplished so as to enable it to start afresh for a new preamble. During preamble search of the noise values which precede the preamble, the accumulator adds the shifted auto-correlation values of noise in the inter-frame gap, and due to the non deterministic or random nature of noise the accumulator does not hold any significant value during that interval.

The technique of FIG. 7 works well in the absence of interferers since the shifted correlation values from the two antenna paths add up constructively to improve the correlation strength. FIG. 8 shows this in the form of vectors, where a signal 802 from the RX_IQ stream associated with antenna 1 is added to signal 804 associated with RX_IQ signal stream of antenna 2 antenna to generate combined signal stream 806.

FIG. 9 shows the phase relationship between the segments of a base station as was shown in FIG. 3. Each of Base stations C1 302, C2 304, C3 306 transmit simultaneously on different segments S0, S1, S2 and at different subcarrier combinations, as was shown in FIG. 2. Since each of the neighbor BS segments C1, C2, C3, etc transmit the preamble on every third sub carrier as shown in FIG. 2, the resulting phases of shifted correlation at the subscriber as shown in FIG. 9 will be 120 degrees apart. A parameter associated with a station is the "reuse number", which indicates the number of frequencies deployed by the network. FIGS. 2 and 3, in a reuse-1 scenario, show that the cell is divided into spatial zones serviced by different subcarriers in the preamble. For reuse-1 interference the subscriber station might see the interference in all three segments from neighboring Base Stations.

FIG. 9 shows the signal received from each interferer for reuse-3 when the subscriber receives the signal from all Base Stations with equal power. As shown in the figure, if all the BS interferers are received with the same power 902, 904, 906, the resulting signal will be cancelled out and therefore the preamble cannot be detected. This is an exceptional scenario and is shown for example only. Naturally, the typical signal from each base station BS1, BS2, BS3 will have a different level due to different multipath channels as shown in FIG. 10, where base stations BS1, BS2, BS3 sum to produce combined power 1116. The conventional combining of the Rx signal at the antennas will give better results in absence of BS Interferers but will prove ineffective in presence of Interferers. FIGS. 11A and 11B show signal streams combining at the first receive antenna A1 and second receive antenna A2 in a typical multipath channel in presence of BS interferers. The individual antenna signals A1 1108 and A2 1116 of FIGS. 11A and 11B, respectively, combine as shown in FIG. 11C to produce a weaker signal 1120 than either contributor 1108 or 1106 individually. It is then clear that for certain signal conditions, the combined cross correlation of the individual RX_IQ streams combine in a destructive manner, thereby degrading the performance of the prior art preamble detection.

OBJECTS OF THE INVENTION

A first object of this invention is a preamble detector for OFDMA signals which has, for each receive data stream, sample buffers, a first and a second complex conjugator, a first and second multiplier, each operating on a sample buffer output and conjugator output, the multiplier outputs added and an absolute value formed, where each stream has an associated absolute value output thus formed, the absolute value outputs summed to form an output to be threshold compared to detect a preamble.

A second object of the invention is a process for preamble detection, the process including, for each stream of incoming data, forming original data, first delay data, and second delay data, multiplying the first delayed data with conjugated second delayed data to form a first multiplier output, multiplying the original data with conjugated second delay data to form a second multiplier output, summing and taking the absolute value of the first multiplier output and second multiplier output, and summing each absolute value for each stream to compare with a threshold to form a preamble detect output.

SUMMARY OF THE INVENTION

A preamble detect includes, for each incoming signal stream, a first delay formed from an input signal, and a second delay formed from the first delay output. A first multiplier forms an output by multiplying the conjugated output of the second buffer with the output of the first buffer. A second multiplier forms an output by multiplying the input signal with the conjugate of the first delay output. The first multiplier and second multiplier outputs are summed and an absolute value is formed from the sum. The absolute values outputs associated with each incoming signal stream are summed to form a preamble detection signal, and the preamble detection signal may be compared with a threshold to form a preamble detection output.

BRIEF DESCRIPTION OF THE DRAWINGS

FIG. 1 is an illustration of the preamble part of a wireless frame.

FIG. 2 shows the preamble subcarrier allocations for base station segments using reuse-3.

FIG. 3 shows how base station segments are structured in a cellular fashion.

FIG. 14 shows a signal processing block diagram according to the present invention.

DETAILED DESCRIPTION OF THE INVENTION

A receiver at the subscriber station of an OFDM or OFDMA based wireless network receives frames of data that are preceded by a specifically designed preamble sequence which has the property of repetition and delay. The receiver is part of a wireless network which consists of several base Stations (BS) that act as the control units and the conduit to any associated wired networks. The base stations are arranged in a cellular fashion, and each base station divides its signals into three sectors each serviced with a different preamble operating on a different subcarrier. Each base station segment transmits its preamble in every third subcarrier as allocated to it. At edges of the cells or at locations where neighboring base stations are also visible to a subscriber station, the subscriber station is subjected to preambles from the neighboring base stations, such signals resulting in potentially destructive interference at the subscriber station (SS). The ability of the subscriber station to detect preambles of its base station robustly is preserved even under such circumstances by using the magnitude of the preamble correlation seen at each of two antennas at the subscriber stations so that the preamble correlations from neighboring base stations are used to strengthen the preamble detect process.

Figure 12A:
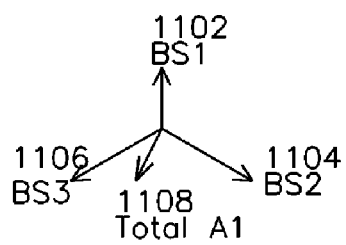
FIGS. 12A and 12B show vector diagrams for power received at first and second antenna, respectively, for a base station which includes interferers.
Figure 12B:
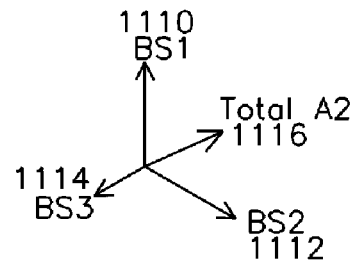
Figure 12C:
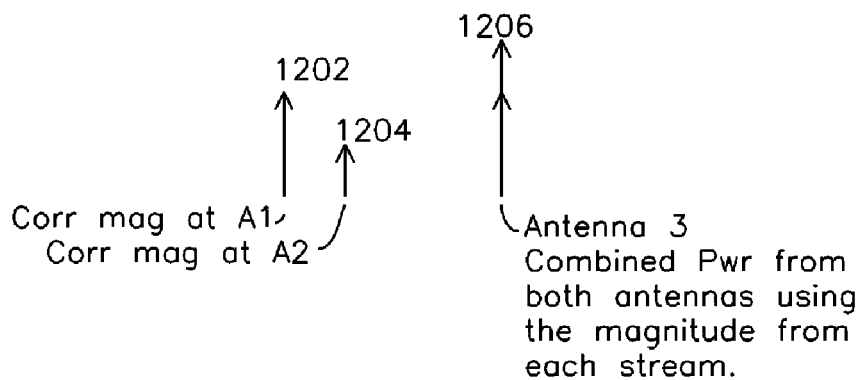
FIG. 12C shows a vector diagram for autocorrelation combining according to one embodiment of the invention.

In one embodiment of the present invention, the shifted correlation values from each antenna are combined after computing the magnitude of the correlation. Therefore the correlation values from interfering Base Stations combine constructively and improve the shifted correlation quality enabling detection of the preamble in presence of Strong Interferers as shown in FIG. 12.

Figure 4:
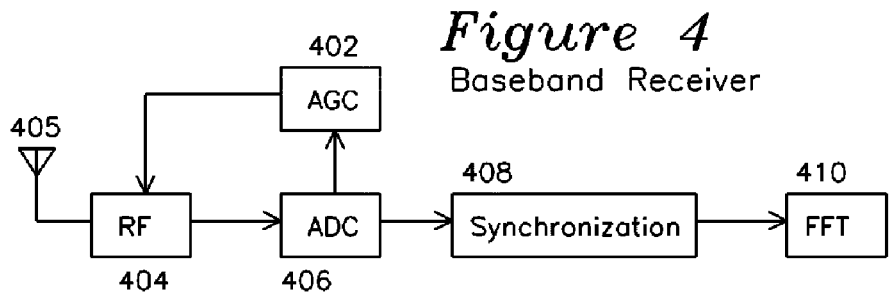
FIG. 4 shows a block diagram of the baseband processing portion of an OFDM or OFDMA receiver.
Figure 5:
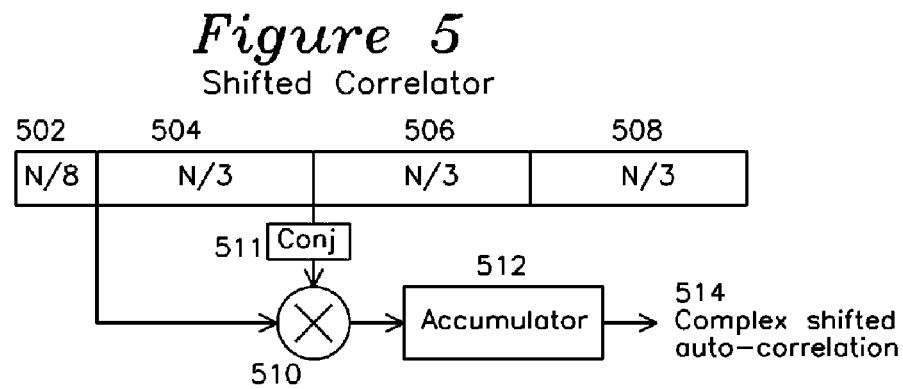
FIG. 5 shows a block diagram for a shifted auto-correlator with a time diagram of a preamble showing samples used in the correlation.
Figure 6:
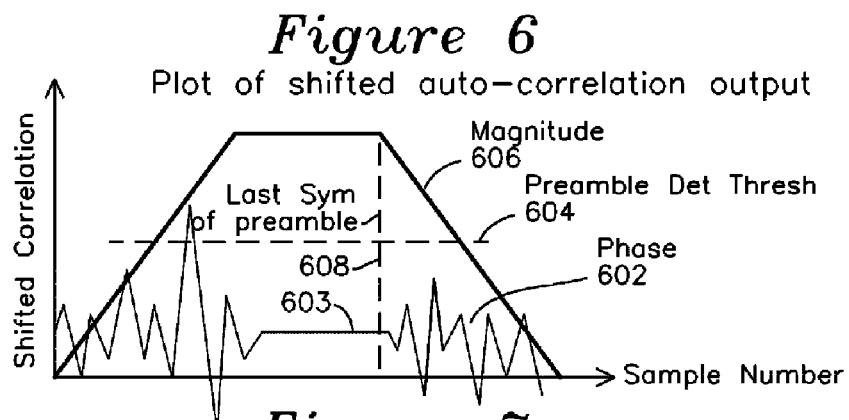
FIG. 6 is a phase and magnitude plot of the shifted auto-correlation output.
Figure 7:
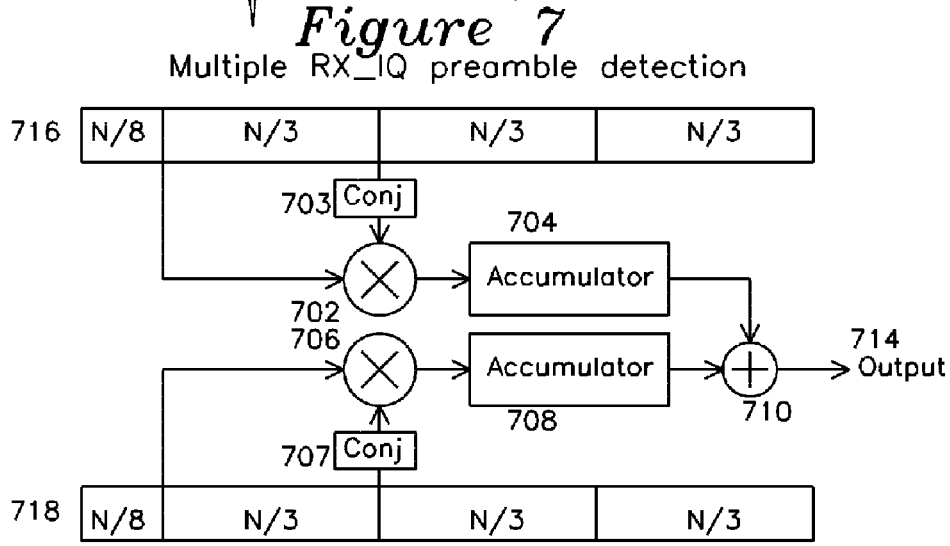
FIG. 7 shows an arrangement for detecting preambles through multiple antennas.
Figure 8:
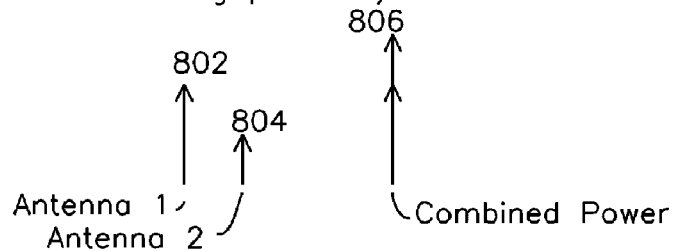
FIG. 8 shows a vector diagram of signals combined from multiple antennas in the absence of neighboring interferers.
Figure 9:
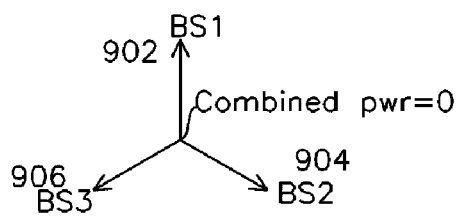
FIG. 9 shows a vector diagram of received preamble signals from neighboring base stations having identical signal strength.
Figure 10:
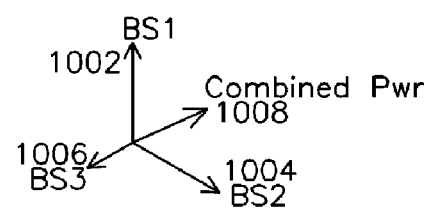
FIG. 10 shows a vector diagram of received preamble signals from neighboring base stations with unequal strength.
Figure 11A:
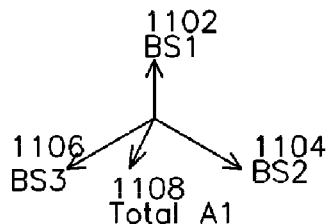
FIGS. 11A and 11B show the combining of preamble detect signals from neighboring stations at a first antenna and second antenna, respectively, for a base station.
Figure 11B:
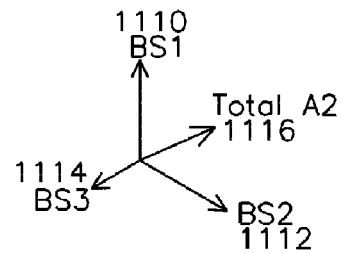
Figure 11C:
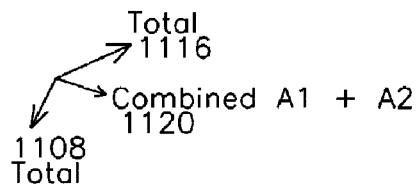
FIG. 11C shows the autocorrelator response for a base station receiving signals shown in FIGS. 11A and 11B.
Figure 13:
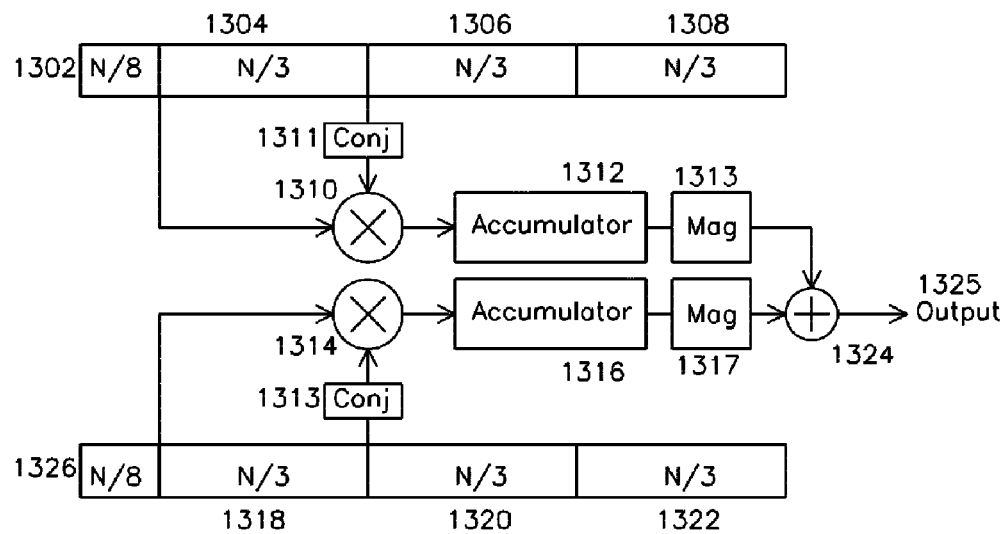
FIG. 13 shows a block diagram and time diagram for preamble reception in one embodiment of the present invention.

FIG. 13 shows an overview diagram for the functional blocks in the preamble detector of the present invention. Preamble 1302 is part of a first RX_IQ baseband digitized stream which was received, down-converted, and digitized from a first antenna, and preamble 1326 is part of a second RX_IQ baseband digitized stream which is similarly processed from a second antenna. Each stream has N/8 samples of the circular prefix (CP) and followed by a first preamble part 1304, a second preamble part 1306, and a third preamble part 1308. The inputs to first multiplier 1310 encounter a differential delay equal to N/3 each, such that the first multiplier accepts an input associated with the start of second preamble part 1306, while the other input of the multiplier accepts a delayed first preamble part 1304. A delay substantially equal to first preamble interval N/3 provides an input with a time relationship to the start of the first preamble 1304 to first multiplier 1310 with the other input an undelayed input of the multiplier associated with the start of second preamble 1306. A dot product (conjugation of one input and multiplication with the other) is carried out on the samples at the beginning of the first N/3 block and the beginning of the second N/3 block. The dot product is a complex multiplication (1310, 1314) of the first operand with the complex conjugate (1311, 1313) of the second operand. Since a valid preamble alone would have the regular structure of repetitive N/3 samples, there would be a strong correlation and therefore strong accumulation over an interval of N/3. At the end of the preamble the correlation begins to taper down as shown in FIG. 6. The accumulator adds up the correlation values continuously. This is however reset to zero upon detection of the frame preamble. The accumulator is followed by a block that computes the magnitude of the result, where the magnitude output of each accumulator 1312 and 1316 is computed by taking the square root of the positive real and imaginary parts squared. The first RX_IQ stream 1302 and second RX_IQ stream 1326 are identically handled. The outputs of the magnitude functions 1313 and 1317 are added, resulting in a strongly positive correlation value which is immune from the destructive component addition shown in FIG. 11C of the prior art, and instead produces the vector addition shown in FIG. 12C.

FIG. 14 shows one embodiment of the invention for a two RX_IQ stream case. Each stream 1401 and 1417 is separately handled by identical preamble processors 1403 and 1419, such that the preamble detector 1400 may be expanded for any number of streams by the addition of an additional preamble processor for each new stream. First stream 1401 is applied to first preamble processor 1403 and is subject to a first delay 1402 such as a N/3 sample buffer with a delay equal to a preamble part. The output of the first delay 1402 is applied to second delay 1404 such as an N/3 sample buffer with a delay equal to a preamble part. Each sample buffer 1402 and 1404 stores both I and Q values of the sample stream. The conjugate blocks 1406 and 1410 reverse the polarity of the applied Q sample. The first multiplier block 1406 is a complex multiplier operating on the conjugated output of the second delay and the output of the first delay, carrying out 4 real multiplications and two additions per operation. The accumulator 1414 operates by adding the recently correlated values and subtracting the previous correlation values of the N/3 delayed path from 1404, although the accumulator can also be realized by summing a fixed number of previous samples, or any other prior art method for accumulation of samples over a fixed sample window size. The summer 1414 providing the N/3 accumulated output is provided to the MAG block 1416 that performs sqrt(Re(.)^2+Im(.)^2), which output produces a magnitude value that is always positive, since the squared real and squared imaginary terms are positive values. The functions of second preamble processor 1419 operate similarly, where the output is the magnitude 1432 of the accumulated difference 1430 whereby a number such as N/3 samples of the output of a first multiplier 1426 is subtracted from the output of second multiplier 1428. The first multiplier 1426 forms a complex product from the conjugate 1422 of the output of a second delay 1420 whose input is coupled to the output of a first delay 1418. The second multiplier 1428 forms a product from an RX_IQ stream input 1418 coupled to the first delay 1418 and the output of the first delay 1418 which is conjugated 1424.

The outputs of all of the preamble processors 1401 and 1417 are summed 1434 together, and compared 1440 with a threshold 1436 to form a preamble detect output 1438. The threshold 1436 is based on the magnitude of the raw I, Q signals from the input RX_IQ streams 1401 and 1417.

What is claimed is:

1. A process for preamble detection in a plurality of baseband receive data streams having at least one preamble of length N, the process having:
    a first step of delaying said receive data stream by an amount substantially equal to N/3, thereby producing a first delay output;
    a second step of delaying said first delay output by an amount substantially equal to N/3, thereby producing a second delay output;
    a third step of multiplying each conjugated second delay output by said first delay output to generate a first multiplier output;
    a fourth step of multiplying each conjugated first delay output by said receive data stream to generate a second multiplier output;
    a fifth step of accumulating said first multiplier output by subtracting said second multiplier output from said first multiplier output, thereafter forming a magnitude output from said accumulator output;
    a sixth step of summing all of the magnitude outputs and comparing the sum with a first threshold, asserting a preamble detect when said sum exceeds said first threshold.

2. The process of claim 1 where said first delay and said second delay correspond to the duration of a preamble part.

3. The process of claim 1 where said conjugated output changes the sign on an imaginary part of a value.

4. The process of claim 1 where said first and said second multiplier are complex multipliers.

5. The process of claim 1 where said accumulator operates over a number of samples substantially equal to the number of samples in a preamble part.

6. The process of claim 1 where at least one of said input streams is compatible with IEEE 802.16e.

7. The process of claim 1 where said number of streams is two or three.

8. The process of claim 1 where said first step delay or said second step delay is a memory buffer having a length equal to N/3 samples rounded to the next integer.

9. The process of claim 1 where said baseband data stream is derived from a wireless signal which is compatible with IEEE 802.16e.

10. The process of claim 1 where said first step delay or said second step delay utilizes a sample buffer or FIFO to delay a particular data stream.

11. A process for preamble detection in a plurality of baseband receive data streams having at least one preamble of length N, the process having:
    a stream magnitude generation for each stream, the magnitude generation having:
        a first step of delaying a particular receive data stream by an amount substantially equal to N/3, thereby producing a first delay output;
        a second step of delaying said first delay output by an amount substantially equal to N/3, thereby producing a second delay output;
        a third step of multiplying each conjugated second delay output by said first delay output to generate a first multiplier output;
        a fourth step of multiplying each conjugated first delay output by said receive data stream to generate a second multiplier output;
        a fifth step of accumulating said first multiplier output by subtracting said second multiplier output from said first multiplier output, thereafter forming a magnitude output from said accumulator output;
    a preamble detection step whereby the magnitude output associated with each said stream is summed together into an accumulator and compared with a threshold value, and when said accumulator exceeds said threshold value, generating a preamble detect output.

12. The process of claim 11 where said first delay or said second delay correspond to the duration of a preamble part.

13. The process of claim 11 where said conjugated output changes the sign of the imaginary component of a value having a real and imaginary component.

14. The process of claim 11 where at least one of said first multiplier or said second multiplier are complex multipliers.

15. The process of claim 11 where said accumulator operates over a number of samples substantially equal to the number of samples in a preamble part.

16. The process of claim 11 where at least one of said input streams is compatible with IEEE 802.16e.

17. The process of claim 11 where at least one said baseband receive data stream comprises an in-phase part and a quadrature part.

18. The process of claim 11 where said first step delay or said second step delay of N/3 is a buffer or FIFO having an integer number of samples closest to N/3.

19. The process of claim 11 where said baseband data stream is derived from a wireless signal which is compatible with IEEE 802.16e.

* * * * *